United States Patent [19]

Damiano et al.

[11] Patent Number: 4,626,954
[45] Date of Patent: Dec. 2, 1986

[54] SOLID STATE POWER CONTROLLER WITH OVERLOAD PROTECTION

[75] Inventors: Michael A. Damiano, Germantown; Dale L. Gass, Brown Deer; Dennis M. Kramer, Brookfield; Richard F. Schmerda, Oak Creek, all of Wis.

[73] Assignee: Eaton Corporation, Cleveland, Ohio

[21] Appl. No.: 647,763

[22] Filed: Sep. 6, 1984

[51] Int. Cl.[4] .............................................. H02H 3/00
[52] U.S. Cl. ........................................ 361/96; 361/97
[58] Field of Search ...................... 361/94, 95, 96, 97, 361/31; 323/235, 241, 319, 322

[56] References Cited

U.S. PATENT DOCUMENTS

| | | | |
|---|---|---|---|
| 4,052,625 | 10/1977 | Cameron | 361/31 X |
| 4,174,496 | 11/1979 | McFall et al. | 361/97 X |
| 4,259,706 | 3/1981 | Zocholl | 361/96 |
| 4,316,230 | 2/1982 | Hansen et al. | 361/96 X |
| 4,338,647 | 7/1982 | Wilson et al. | 361/96 |
| 4,429,339 | 1/1984 | Jaeschke et al. | 361/94 X |
| 4,461,966 | 7/1984 | Hebenstreit | 307/571 |
| 4,553,187 | 11/1985 | Burns et al. | 361/96 |

OTHER PUBLICATIONS

Hexfet Databook, International Rectifier, 1982-83, pp. A-47, A-49, A-50, A-126 and A-129.

Primary Examiner—Patrick R. Salce
Assistant Examiner—Marc S. Hoff
Attorney, Agent, or Firm—C. H. Grace; W. A. Autio

[57] ABSTRACT

A power controller with overload protection having an alternating current source (AC) connected through power lines (L1, L2) and a pair of power switching devices (FET1, FET2) and a current sensor resistance shunt (SH) in series to a load (LD). A line-derived control power supply circuit (LDS) is connected through one of the power switching devices (FET1) to the lower line (L1, L2) such that the control power supply current does not flow through the shunt (SH) or the load (LD). Close and open commands are applied from a control switch (CSW) through a threshold detector (DT) and a logic circuit (LG1) to operate a latch (LCH) that turns the power switching devices (FET1, FET2) on and off under the clocking control of a zero voltage detector (ZVD) and a zero current detector (ZCD) and the gating control of a minimum current circuit (MCC). An overload circuit (AVC, ITC, TTC) provides instantaneous trip of the latch on rupture current or timed trip of the latch on smaller overloads. Opto-isolated indicators (SS, ST) indicate trip conditions and loss of line voltage conditions as well as whether the load current is above or below a minimum current value which is a current level adequate for operation of the control system.

16 Claims, 5 Drawing Figures

SOLID STATE POWER CONTROLLER WITH OVERLOAD PROTECTION

BACKGROUND OF THE INVENTION

Power controllers with overload protection have been known heretofore. However, such prior controllers have been handicapped in that the interface between the logic or control circuit of the power switch and the power supply line was complex. It has also been known in the prior art that D.C. operation of a field effect transistor (FET) may be accomplished by a line-derived power supply such as, for example, is illustrated by the circuit in FIG. 22, page A-47 of the 1982-83 International Rectifier HEXFET Databook. Bi-directional A.C. switches have also been known heretofore such as, for example, is illustrated in FIG. 5, page A-50 of the aforementioned Databook. However, problems have been encountered in attempting to use the simple D.C. control power supplies with the A.C. switch. These attempts have led to complicated power supply schemes such as, for example, that shown in FIG. 6, page A-126 and FIG. 6, page A-129 of the aforementioned Databook. Such problems have arisen due to the necessity of maintaining a minimum of 10 volts and a maximum of 20 volts gate-to-source in order to properly control the FETs; therefore, it has been necessary to provide transformer coupled power supplies to prevent such 20 volt maximum from being exceeded which, if allowed to occur, might render the circuit inoperative. Problems have also been encountered in such overload protection power controllers in that if the control power supply current is allowed to flow in the current sensor such as a shunt in the load circuit, it will tend to modify or interfere with the integrity of the overload signal. Also, such control power supply current has introduced leakage current into the load which is undesirable.

SUMMARY OF THE INVENTION

An object of the invention is to provide an improved solid state power controller with overload protection.

A more specific object of the invention is to provide such overload protected solid state power controller with a line-derived control power supply that does not introduce any current into the overload current sensor which, if allowed to occur, would interfere with the overload current signal.

Another specific object of the invention is to provide such overload protected power controller with a line-derived control power supply that does not introduce any leakage current into the load.

Another specific object of the invention is to provide such overload protected solid state power controller with a latch controlled power switch and means for setting such latch to close the power switch at the zero voltage crossing of the power supply and for resetting such latch to open the power switch at the zero current crossing of the power supply thereby to minimize RFI (radio frequency interference) and EMI (electromagnetic interference).

Another specific object of the invention is to provide such overload protected solid state power controller with means for applying an "on" command and minimum current indication which is effective in the event such "on" command does not cause closure of the power circuit to the load.

Another specific object of the invention is to provide such overload protected solid state power controller with solid state power switching means and actual status indicator means responsive to a signal taken directly from such solid state switching means for indicating the actual status including trip status thereof.

Another specific object of the invention is to provide such overload protected solid state power controller with a status indicator for indicating loss of line voltage.

Another specific object of the invention is to provide such overload protected solid state power controller with a solid state latch for latching such power controller in its closed or open state together with means for applying a close or open command to such latch and a threshold detector that detects such closed or open command including hysteresis means for insuring stable operation thereof.

Another specific object of the invention is to provide such overload protected solid state power controller with overload current responsive means that floats together with said control power supply with respect to the power line voltage.

Other objects and advantages of the invention will hereinafter appear.

These and other objects and advantages of the invention are attained by providing a solid state power controller with overload protection for use in a power circuit having an A.C. power supply line connected to a load, said controller having a pair of series-reverse connected controlled power switching devices and a current sensor connected in series in said power circuit, said controlled power switching devices being of a type having a high forward blocking voltage and a low reverse blocking voltage, characterized by a control circuit selectively operable for controlling said power switching devices to energize or deenergize said load, a line-derived rectified control power supply for said control circuit connected to said power circuit so that the rectified control power supply current does not flow through said current sensor or said load thereby to prevent such control power supply current from interfering with the load current sensed by said current sensor as well as to prevent said control power supply current entering as leakage current in the load, said control circuit comprising a solid state latch operable when set for closing said power switching devices and operable when reset for opening said power switching devices, selectively operable means for setting or resetting said latch, and overload trip means responsive to said current sensor detecting an overload condition for resetting said latch to reopen said power switching devices.

BRIEF DESCRIPTION OF THE DRAWINGS

FIG. 4 is a graph showing by curves (a) and (b) operating characteristics of the absolute value circuit of FIG. 2a.

DESCRIPTION OF THE PREFERRED EMBODIMENT

Figure 1:
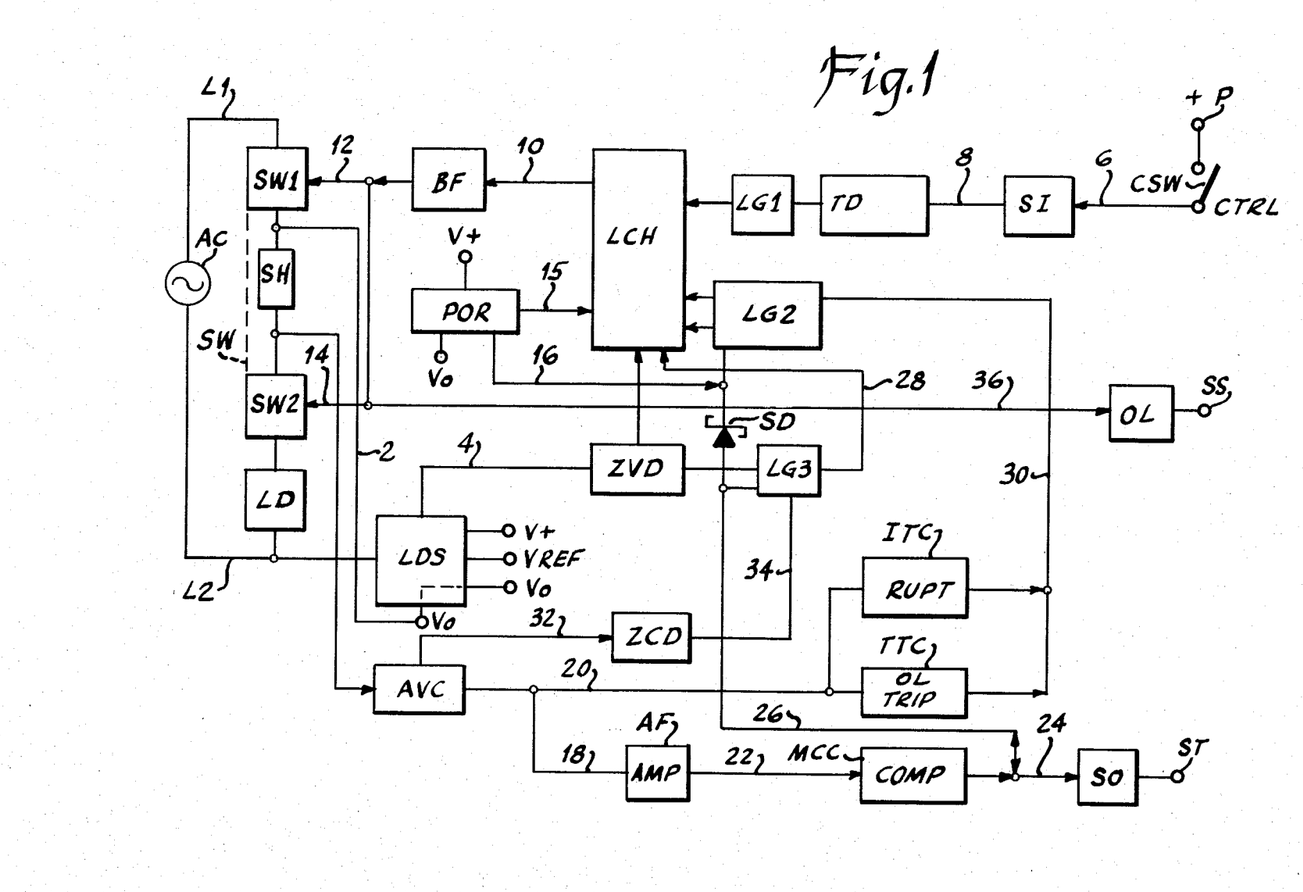
FIG. 1 is a block diagram of the solid state power controller with overload protection constructed in accordance with the invention.

Referring to FIG. 1, there is shown a block diagram of a solid state power controller with overload protection constructed in accordance with the invention. As shown therein, an alternating current source AC is connected through supply lines L1 and L2 in a power circuit SW that includes a first alternating current switch SW1, a current sensing resistance shunt SH, a second alternating current switch SW2 and a load LD in series with source AC.

Figure 2A:
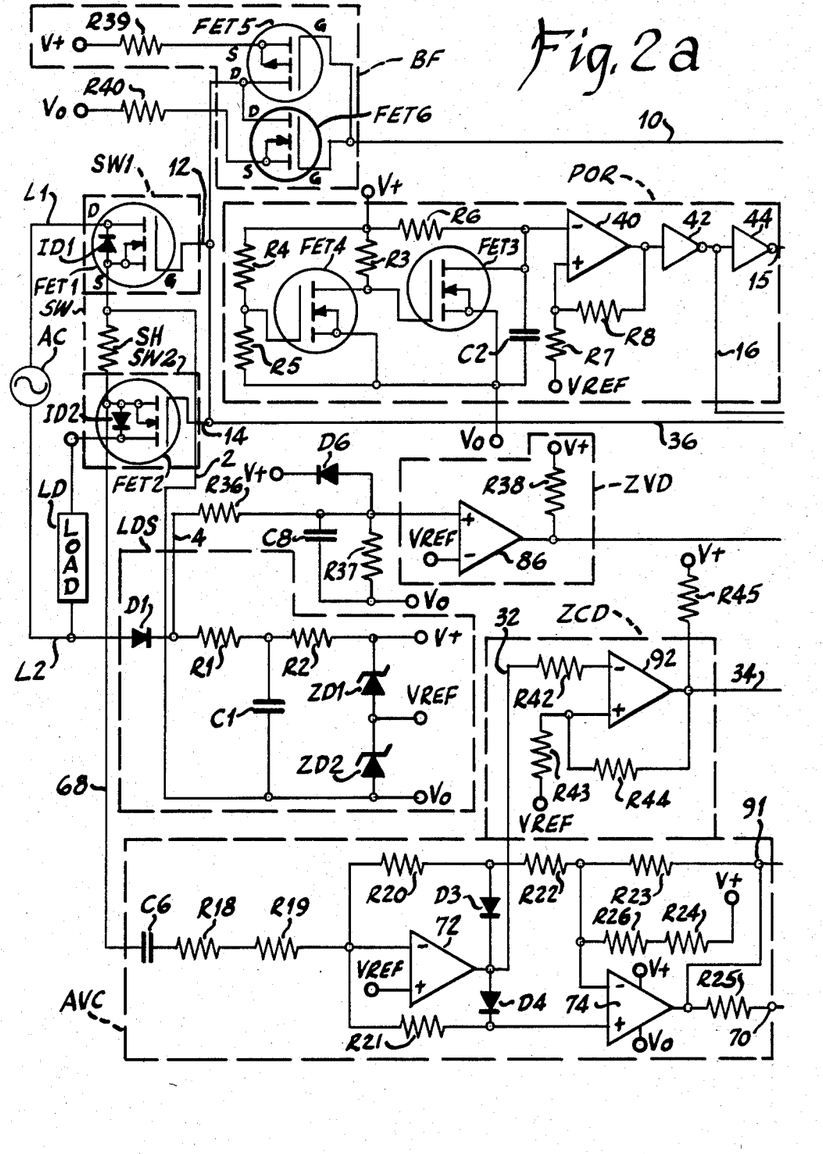
FIGS. 2a and 2b, when arranged so that the right-hand side of FIG. 2a connects to the left-hand side of FIG. 2b, show in more detail a circuit diagram of the controller of FIG. 1.
Figure 2B:
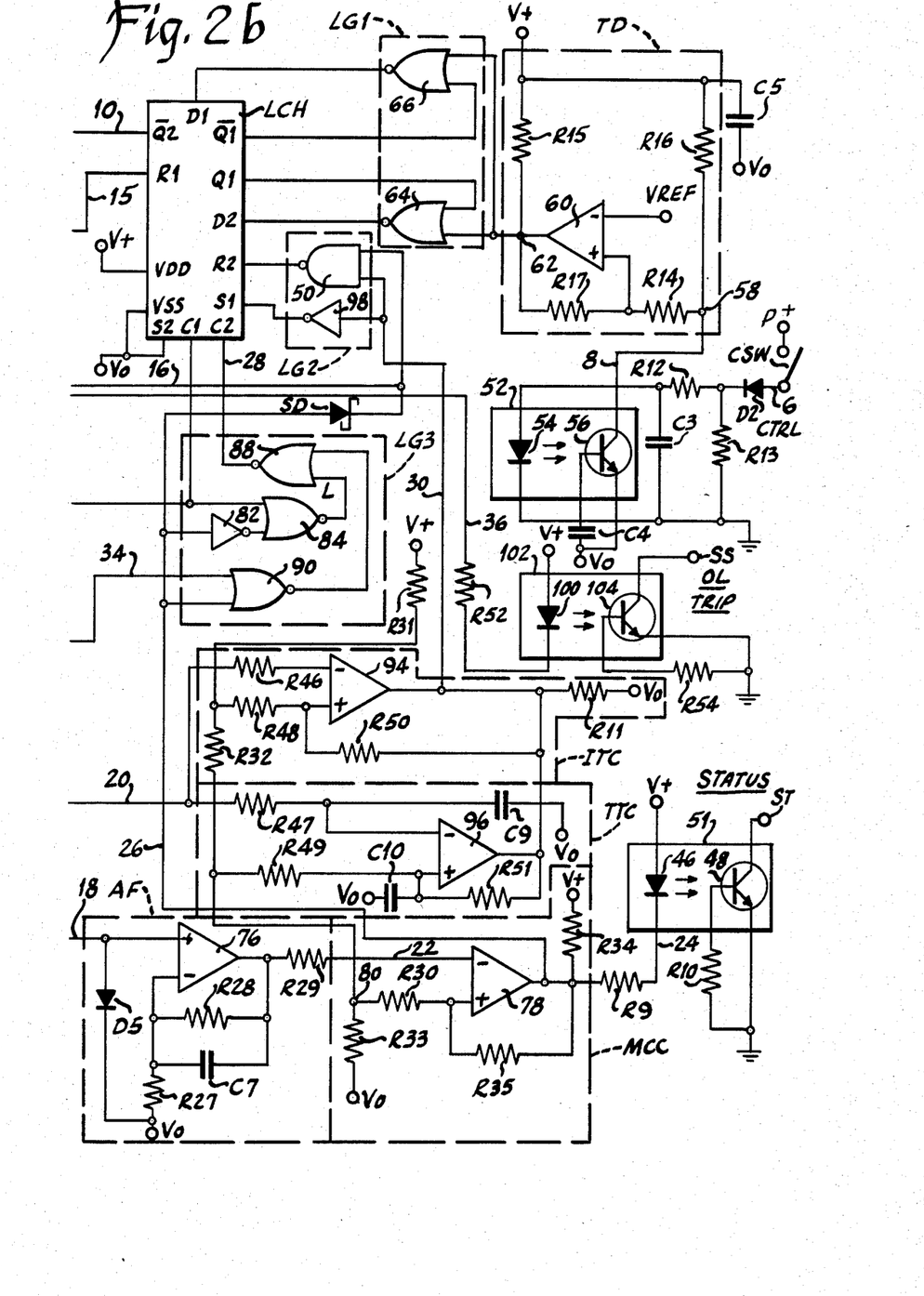

A line-derived supply circuit LDS is connected to the aforementioned power circuit so that its current does not flow through either shunt SH or load LD. For this purpose, line-derived control power supply circuit LDS is connected from line L2 and conductor 2 through alternating current switch SW1 to line L1. Control power supply circuit LDS supplies positive D.C. voltage V+, reference D.C. voltage VREF and D.C. voltage Vo or virtual ground to various points in the control circuit most of which are not shown in FIG. 1 but are shown in the more detailed circuit diagram in FIG. 2. Control power supply circuit LDS also supplies a control signal through conductor 4 to zero voltage detector ZVD for purposes hereinafter described.

The block diagram in FIG. 1 also shows means for applying control commands in order to close or open alternating current switches SW1 and SW2 in the power circuit of load LD. For this purpose, there is provided a selectively operable control switch CSW connected from a positive voltage P through conductor 6, an opto-isolator signal-in circuit SI, conductor 8, a threshold detector and hysteresis circuit TD and a logic circuit LG1 to a latch LCH, the purpose of this latch being to store the control command and thereby maintain operation of alternating current switches SW1 and SW2. For this purpose, latch LCH is connected through a conductor 10 and a buffer BF and then through conductors 12 and 14 to power switches SW1 and SW2, respectively. Latch LCH is preferably of the dual type-D flip-flop type or the like which includes a first latch for controlling power switches SW1 and SW2 and a second latch which is used to keep the first latch reset after an overload trip as hereinafter more fully described. A power-on reset circuit POR is supplied with V+ and Vo voltages from line-derived supply LDS and is operative through conductors 15 and 16 to reset the two flip-flops of latch LCH, the signal on conductor 16 going through logic circuit LG2 for purposes hereinafter described in connection with FIG. 2.

For overload protection purposes, an absolute value circuit AVC is connected across current sensor shunt SH and provides output signals on conductors 18 and 20. The signal on conductor 18 is amplified and filtered in amplifier-filter AF and then applied through conductor 22 to a minimum current circuit MCC of the comparator type or the like. The output of minimum current circuit MCC is connected through conductor 24 and a signal-out circuit SO of the opto-isolator type or the like to a status terminal ST and is also connected through conductor 26 to a logic circuit LG3. The differential signal at status output terminal ST will be either low or high depending on the magnitude of the power circuit current sensed at shunt SH. For example, if minimum current circuit MCC senses a minimum current which may, for example, be 10% of rated value or greater, the status signal at output terminal ST will be low. On the other hand, if minimum current circuit MCC senses that the power circuit current is less than minimum value, that is, less than 10% of rated value, the status signal at output terminal ST will be high. When the current sensed by minimum current circuit MCC is below minimum value, the signal on conductor 26 will be used in conjunction with the output pulse of zero voltage detector ZVD to operate logic circuit LG3 at or near the zero point of the power supply to apply a pulse through conductor 28 to clock latch LCH. This clocking will set the latch if a close command is being applied at control switch CSW thereby to close power switches SW1 and SW2. When the A.C. current sensed by minimum current circuit MCC is at or above minimum value, the signal on conductor 26 will be used in conjunction with the output pulse of zero current detector ZCD to operate logic circuit LG3 at or near the zero current crossing of the A.C. power supply to apply a pulse through conductor 28 to reset the latch if an open command is being applied at switch CSW in order to open power switches SW1 and SW2.

An overload trip function is accomplished as follows. If the signal on conductor 20 at the output of absolute value circuit AVC indicates an extremely high overload current condition such as a "rupture", instantaneous trip circuit ITC will respond thereto and apply a signal through conductor 30 and logic circuit LG2 to reset latch LCH thereby causing interruption of the power circuit at power switches SW1 and SW2. On the other hand, if the signal on conductor 20 at the output of absolute value circuit AVC indicates a small overload current condition, timed trip circuit TTC will respond thereto to apply a signal through conductor 30 and logic circuit LG2 to reset latch LCH for like purposes except that there will be a time period involved before circuit TTC reacts.

The purpose of zero current detector ZCD which receives its output from absolute value circuit AVC through conductor 32 and applies its output through conductor 34 to logic circuit LG3 is to control turn-off of the power switches SW1 and SW2 at the zero crossing point of the load current. Logic circuit LG3 permits such turn-off at the zero current crossing point provided the signal on conductor 26 indicates that the power circuit current is at or above minimum current value.

The purpose of Schottky diode SD is to transmit a loss-of-line-voltage signal to status output terminal ST. Under normal operating conditions, diode SD is biased from conductor 16 so that it blocks. However, if there is a loss-of-line-voltage condition, conductor 16 will go low to cause a low signal to appear at status terminal ST to indicate this loss-of-line-voltage condition.

Overload current trip indicator circuit OL which may be an opto-isolator circuit or the like receives an input signal through conductor 36 directly from the control terminals of power switches SW1 and SW2 to indicate at switch status output terminal SS the state of the power switches. For example, if the power switches are closed or "on", a high will appear at output terminal SS. On the other hand, if the power switches are turned off or are tripped, a low will appear at output terminal SS.

The operation of the circuit shown in FIGS. 2a–b will now be described. The component circuits in FIGS. 2a–b are enclosed by broken lines and given reference characters like those in the block diagram of FIG. 1. These component circuits are generally in similar locations in FIGS. 2a–b as the blocks in FIG. 1.

As shown at the left-hand portion of FIG. 2a, a pair of N-channel field effect transistors FET1 and FET2 are used as the power switching devices SW1 and SW2 in the power circuit SW. Alternating current source AC is connected through the main power terminals such as the drain D and source S terminals of FET1, shunt SH, integral diode ID2 of FET2 and load LD for one polarity of the A.C. power and through load LD, the drain D and source S electrodes of FET2, shunt SH and integral diode ID1 of FET1 for the other polarity of the A.C. power.

When power is first applied to the system as by connecting alternating current source AC to lines L1 and L2, halfwave rectified current flows from the line L2 through rectifying diode D1, resistors R1 and R2 and zener diodes ZD1 and ZD2 and then through conductor 2 and integral diode ID1 of field effect transistor FET1 to line L1, causing capacitor C1 to start charging in line-derived control power supply circuit LDS. This control power supply circuit LDS has three output terminals V+, VREF and Vo. For exemplary purposes, it may be assumed that V+ will eventually reach 15 volts and VREF will be at 7.5 volts with respect to Vo due to the voltage dividing effect and regulation by resistors R1 and R2 and zener diodes ZD1 and ZD2 as capacitor C1 charges to its full voltage. It will be apparent that control power supply circuit LDS supplies D.C. operating voltages to various points in the control circuits in FIGS. 2a–b.

The function of power-on reset circuit POR at the upper portion of FIG. 2a is to initially reset the two flip-flops in the latch LCH so that they are in their proper "off" states for operation of the system. As will be apparent in FIG. 2b, these two flip-flops are identified by the suffix 1 and the suffix 2 of the reference characters at the terminals of latch LCH. Thus, the first flip-flop has a set terminal S1, a data input terminal D1, a clock terminal C1 and output terminals Q1 and $\overline{Q1}$. The second flip-flop has a set terminal S2 permanently connected to Vo since it is not used, a data input terminal D2, a clock terminal C2 and an output terminal $\overline{Q2}$, output terminal Q2 not being used. The terminals VDD and VSS are supply terminals to the latch and connected to V+ and Vo, respectively. Power-on reset circuit POR comprises a pair of field effect transistors FET3 and FET4, resistors R3–R8, capacitor C2, a comparator 40 and two inverters 42 and 44. When power is first applied to the system as aforementioned, a voltage is applied through resistor R3 to the gate to turn field effect transistor FET3 on thereby to shunt capacitor C2 and discharge it so that it will always start charging from zero voltage. As the voltage rises in response to charging of capacitor C1 in control supply circuit LDS, current flow through voltage divider resistors R4 and R5 causes a voltage to be applied to the gate to turn field effect transistor FET4 on thereby to shunt the gate to source terminals of field effect transistor FET3 to turn it off. As a result, current now flows through resistor R6 to start charging capacitor C2 to provide an R-C time interval for resetting the flip-flop as hereinafter described. As shown in FIG. 2a, a reference voltage VREF is applied through resistor R7 to the noninverting input of comparator 40 causing its output to go high. This high is inverted to a low at the output of inverter 42 and applied through conductor 16 to forward bias Schottky diode SD thereby to energize light emitting diode 46 in opto-isolator 51 through conductor 26 and resistor R9 at the lower right-hand portion of FIG. 2b. This light emitting diode (LED) 46 turns phototransistor 48 on to provide a low signal at status terminal ST indicating that the reset function is taking place. This low on conductor 16 is also applied to the upper input of NAND logic 50 to cause it to apply a high to reset terminal R2 to reset the corresponding flip-flop in latch LCH. The lower input of NAND logic 50 has a high thereon from V+ through resistor R11. The low at the output of inverter 42 is inverted to a high in inverter 44 and applied to reset terminal R1 to reset the corresponding flip-flop in latch LCH. When capacitor C2 in power-on reset circuit POR charges to the threshhold voltage of comparator 40, the output of the latter switches low, the output of inverter 42 switches high and the output of inverter 44 switches low to terminate the reset signal on reset terminal R1 and the high on conductor 16 applied to the upper input of NAND logic 50 causes the output of the latter to return low to terminate the reset signal on reset terminal R2. This reset time interval just described allows the V+ and VREF voltages to reach their proper levels at all points in the control circuit.

Figure 3:
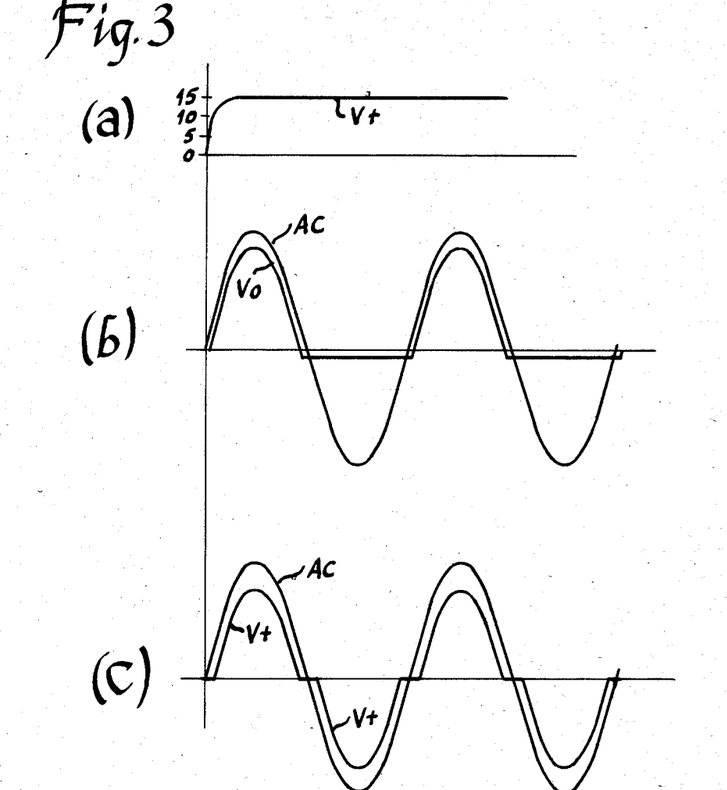
FIG. 3 is a graph showing by curves (a), (b) and (c) operating characteristics of the line-derived power supply used in the controller of FIGS. 2a–b.

The graph in FIG. 3 shows operating characteristics of the line-derived control power supply LDS shown in FIG. 2a. Curve (a) in FIG. 3 shows the line-derived control power supply D.C. voltage V+ appearing at terminal V+ with respect to terminal Vo in FIG. 2a. As will be apparent, this voltage V+ will be a constant 15 volts or the like depending upon the ratings of zener diodes ZD1 and ZD2 used therein.

Curves (b) in the graph of FIG. 3 show a sinewave which represents the voltage of the alternating current power supply AC and also shows a curve which represents the voltage Vo in the control power supply in FIG. 2a. It will be apparent from these curves that during the first half cycle, voltage Vo will be displaced from the line L1 voltage by the voltage drop of integral diode ID1. During the next half cycle, voltage Vo in FIG. 2a is again displaced by the voltage drop of integral diode ID1 from the A.C. voltage, the large voltage difference between the line L2 and the voltage Vo being the voltage drop across integral diode ID2 plus the voltage drop across resistance shunt SH and the load LD. From these curves (b), it will be apparent that the voltage Vo in the control power supply LDS of FIG. 2a tracks the line L1 voltage at the upper side of alternating current source AC by a one diode drop displacement.

The curves (c) in the graph of FIG. 3 illustrate the voltage V+ in the control power supply LDS in FIG. 2a relative to the alternating current source A.C. voltage. As shown therein, the control circuit power supply voltage V+ tracks the A.C. voltage by a difference of 15 volts plus the voltage drop across diode ID1 which is 0.6 volts or the like.

The turn-on operation of the power controller of FIGS. 2a–b will now be described. This turn-on operation is initiated by closing control switch CSW at the upper right-hand portion of FIG. 2b. This energizes optoisolator 52 in a circuit extending from positive voltage terminal P through control switch CSW, unidirectional diode D2, resistor R12 and LED 54 to ground, this signal input circuit also including a resistor R13 connected from the cathode of diode D2 to ground and a capacitor C3 connected across LED 54. LED 54 turns phototransistor 56 on, there being a small transient suppression capacitor C4 connected between the base and emitter of transistor 56, whereby transistor 56 connects Vo voltage to the input terminal 58 of threshold detector circuit TD. This circuit TD is a threshold detector and hysteresis circuit and comprises a comparator 60 having its inverting input connected to voltage VREF and having its noninverting input connected through a resistor R14 to terminal 58. V+ voltage is connected through a resistor R15 to the output of comparator 60 and also through a resistor R16 to input terminal 58 and also through a capacitor C5 to Vo voltage. The output of comparator 60 is connected through a hysteresis feedback resistor R17 to its noninverting input. Output terminal 62 of threshold detector DT is connected through logic circuit LG1 to latch LCH for purposes hereinafter described. It will be apparent that before control switch CSW was closed, the noninverting input of comparator 60 had a higher positive voltage than the inverting input so that a high was applied from output terminal 62 to the lower input of NOR logic 64 and to the upper input of NOR logic 66 resulting in low inputs to data terminals D1 and D2 of latch LCH. Since the flip-flops in latch LCH have been reset, a low is applied from output terminal Q1 to the upper input of NOR logic 64 and a high is applied from output terminal $\overline{Q1}$ to the lower input of NOR logic 66 without effect at this time. When Vo volts is applied to input terminal 58 of the threshold detector in response to the close command, the noninverting input of comparator 60 drops substantially below the reference voltage VREF such as to 4 volts or the like, causing the output of the comparator to go low which is applied to the lower input of NOR logic 64 and the upper input of NOR logic 66. Since we now have a low signal at both inputs of NOR logic 64, its output applies a high to data terminal D2 of the latch. The low applied to the upper input of NOR logic 66 is without effect at this time. With a high at data terminal D2, the suffix 2 flip-flop will be clocked to its on state by zero voltage detector ZVD on the next near zero voltage crossing of the rectified power supply voltage in the manner hereinafter described.

Figure 4:
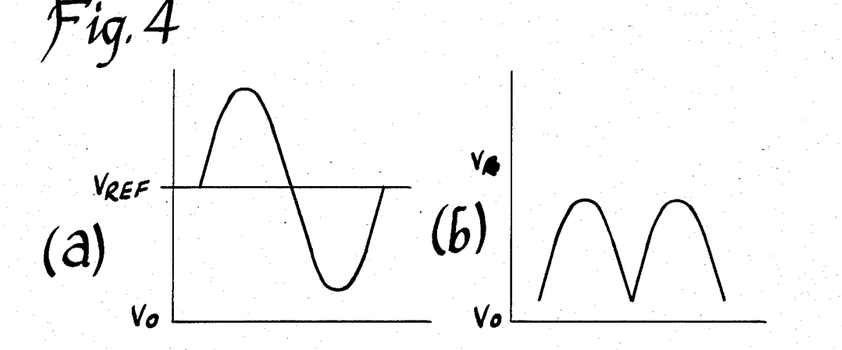

Since this clocking of the suffix 2 flip-flop requires a signal not only from zero voltage detector ZVD but also a signal from minimum current circuit MCC at the lower portion of FIG. 2b, the manner in which the latter signal is obtained will first be described. While shown only in connection with amplifier 74, it may be assumed that all ten amplifiers and comparators in FIGS. 2a–b are supplied with operating voltage from the V+ and Vo terminals of line-derived control power supply circuit LDS. A signal proportional to the load current in the power circuit is taken from across resistance shunt SH and applied through conductor 68 to the input of absolute value circuit AVC at the lower portion of FIG. 2a. This absolute value circuit is a device that receives the floating A.C. signal from across shunt SH and amplifies it with reference to voltage VREF as shown in FIG. 4a and then converts it to a voltage of one polarity at its output terminal 70 as shown in FIG. 4b. This load current proportional signal is applied from conductor 68 through coupling capacitor C6, resistor R18 and trim resistor R19 to the inverting input of amplifier 72. Reference voltage VREF is applied to the noninverting input of first stage amplifier 72. This absolute value circuit also includes a second stage amplifier 74 and associated circuit components which include unidirectional diodes D3 and D4 and resistors R20–R25 and trim resistor R26. This second stage amplifier 74 shifts the load current signal from reference VREF shown in FIG. 4a to the Vo reference point shown in FIG. 4b and rectifies it to provide the absolute value shown in FIG. 4b which appears at output terminal 70.

This signal is applied from output terminal 70 to the noninverting input of an additional amplifier and filter circuit AF which includes in addition to amplifier 76 associated components which include a unidirectional diode D5, resistors R27–R29 and capacitor C7. Clamping diode D5 is connected from the noninverting input to voltage Vo to prevent amplifier saturation so as to maintain timing speed during switching. That is, when the circuit is switched off, the minimum current signal goes off much faster so that the circuit can recover quicker thereby improving the response time of the status circuit. This additional amplifier and filter circuit AF feeds its output put to minimum current circuit MCC. This additional amplifier and filter circuit is provided to have a better noise margin because what will be sensed by the minimum current circuit MCC is only 10% of the rated current, a very small value when compared with the rupture current sensed by instantaneous trip circuit ITC which may be 750% of rated current so that there is quite a broad range that is being covered, that is, 0.1 times the nominal value of 100% to 7.5 times that nominal value, therefore making the additional amplification and filtering desirable for accurate sensing.

The output of circuit AF is applied to the inverting input of minimum current comparator 78 while its noninverting input is connected through resistor R30 to a low voltage point 80 in a voltage divider that includes resistors R31, R32 and R33 connected in series between voltages V+ and Vb. Minimum current circuit MCC also includes a resistor R34 connected from voltage V+ to the output of comparator 78 and a feedback resistor R35 connected from the output of comparator 78 to its noninverting input. From the foregoing, it will be apparent that when the power circuit current that is being sensed is under 10% of rated value, the output of minimum current circuit MCC at comparator 78 will be high but when the power circuit current being sensed is at or above 10% of rated current, such output will be low. This output from the minimum current circuit is applied not only to the opto-isolator 51 and therethrough to status indicator terminal ST but also through conductor 26 for use in connection with the aforementioned clocking of the suffix 2 flip-flop of latch LCH.

The manner in which the aforementioned flip-flop is clocked to its on state will now be described. It will be recalled that although the close command has been applied in accordance with the above description, the power circuit has not yet been closed; therefore, the output of the minimum current circuit MCC on conductor 26 is high. This high is inverted to a low in inverter 82 and applied to the lower input of NOR logic 84 in logic circuit LG3. Now, when the first zero voltage approach occurs on the power supply circuit LDS and is applied from line-derived control power supply LDS through resistor R36 to the noninverting input of comparator 86 in zero voltage detector ZVD, this zero voltage detector outputs a negative pulse. The inverting input of comparator 86 is connected to reference voltage VREF. The noninverting input of comparator 86 is also connected to a filter comprising a resistor R37 and a capacitor C8 connected in parallel to voltage Vo. And this noninverting input is also connected through a unidirectional diode D6 to voltage V+ to provide a clamp on the input voltage to the zero voltage detector. Also, the output of comparator 86 is connected through a pull-up resistor R38 to voltage V+. Since the lower input of NOR logic 84 is now being held at low, a low pulse on the upper input thereof causes a positive pulse output to the lower input of NOR logic 88, the upper input of which is being held low by NOR logic 90 because of the high on conductor 26 being applied to its lower input. As a result, a negative pulse is applied by NOR logic 88 to clock terminal C2 of latch LCH, the positive-going trailing edge of this pulse clocking the suffix 2 flip-flop of the latch to its on state. This causes a low to be applied from output terminal $\overline{Q2}$ to buffer BF at the upper left-hand portion of FIG. 2a. Buffer BF comprises two field effect transistors including a P-channel FET5 and a N-channel FET6 with the source terminal of FET5 being connected through resistor R39 to voltage V+ and the source terminal of FET 6 being connected through resistor R40 to voltage Vo and the drain terminals of the two FETs being connected together and through conductors 12 and 14 to the gates of field effect transistors FET1 and FET2 in the power circuit. From the foregoing it will be apparent that FET5 is the turn-on buffer and that FET6 is the turn-off buffer. For this purpose, the low coming from output terminal Q2 of the latch is applied to the gate of FET5 to turn it on thereby causing voltage V+ to be applied through resistor R39 and FET5 to the control terminals such as gates G of FET1 and FET2 to turn them on or rendering them conducting thereby completing the power circuit to load LD. From the foregoing, it will also be apparent that a high from output terminal $\overline{Q2}$ as hereinafter described will turn FET6 on to apply voltage Vo through resistor 40 to the gates of FET1 and FET2 to turn them off which will occur when the latch is reset as hereinafter described.

With the power circuit completed as hereinbefore described, a signal will now be applied from resistance shunt SH through absolute value circuit AVC to its output 70 as hereinbefore described, this signal going through amplifier and filter circuit AF to minimum current circuit MCC. An A.C. signal is applied from the output of first stage amplifier 72 through conductor 32 to zero current detector ZCD. The single polarity signal shown in FIG. 4b is also applied from the output of second stage amplifier 74 to output terminal 91 of the absolute value circuit AVC and therethrough to the inputs of instantaneous trip circuit ITC and timed trip circuit TTC.

During power-on, when the output of minimum current circuit MCC is high, opto-isolator circuit 51 will not be operated so that the status indication at status output terminal ST will be high. Following power-on, when the current in the power circuit rises above 10% of nominal value, the output of comparator 78 in the minimum current circuit MCC will go low causing LED 46 to be energized through resistor R9. This causes phototransistor 48 to be turned on to provide a low indication at status output terminal ST. A current path through resistor R10 is provided between the base and emitter of phototransistor 48. From the foregoing it will be apparent that if the current in the power circuit should ever drop below 10% of its nominal value, the status indicator will indicate that condition by a high at status output terminal ST to alert the operator.

The off command operation of the power controller will now be described. This off command is initiated by opening control switch CSW at the upper right-hand portion of FIG. 2b. This causes phototransistor 56 to be turned off so that the voltage at input terminal 58 of threshold detector TD will shift upwardly thereby causing the voltage at the output of comparator 60 to go high. At this point, it should be noted that the resistors in the threshold detector circuit provide an hysteresis effect whereby there must be a substantial difference in the input voltages with respect to the reference voltage VREF for turn-on and turn-off. For example, when the control switch CSW is closed, the voltage at the noninverting input of comparator 60 will drop to about 4 volts for turn-on and must be raised to about 10 volts for turn-off. In this manner, if the threshold detector is in its "off" state and there is some noise on the control line, such as electromagnetic interference or capacitive coupling to the control line, for example, those noise pulses usually are not of sufficient amplitude or of sufficient duration to cause the threshold detector to respond thereto; therefore, the threshold detector with its hysteresis effect prevents the logic from responding to noise on the control line.

The aforementioned turn-off command causes the output of comparator 60 to go high which is applied from output terminal 62 to the lower input of NOR logic 64 and the upper input of NOR logic 66. This causes data terminal D2 to go low preparatory to clocking off the suffix 2 flip-flop in the latch as hereinafter described. The high at the upper input of NOR logic 66 is without effect at this time.

From the foregoing, it will be recalled that there is a low on conductor 26 from the minimum current circuit MCC because the current in the power circuit is above 10%. This low is applied to the lower input of NOR logic 90. This low is also applied to inverter 82 whereupon a high is applied to the lower input of NOR logic 84 whereby a low is maintained at the lower input of NOR logic 88 for purposes hereinafter described. With the low at its lower input, NOR logic 90 is conditioned to respond to a pulse from zero current detector ZCD to clock the suffix 2 flip-flop in latch LCH to its off state. Zero current detector ZCD comprises a comparator 92 having its inverting input connected through a resistor R42 to the A.C. output of first stage amplifier 72 in absolute value circuit AVC. The noninverting input of comparator 92 is connected through a resistor R43 to reference voltage VREF and is also connected through a feedback resistor R44 to the output of comparator 92 which output is connected through a pull-up resistor R45 to voltage V+. From the foregoing, it will be apparent that at the zero current crossing of the A.C. supply, a positive pulse will be applied from the output of first stage amplifier 72 through resistor R42 to the inverting input of comparator 92 thereby causing a negative pulse to be applied to the upper input of NOR logic 90 which in turn applies a positive pulse to the upper input of NOR logic 88. Since the lower input of NOR logic 88 is being held low, a negative pulse is applied from the output of NOR logic 88 to clock terminal C2 of latch LCH, the trailing positive-going edge of this negative pulse clocking the suffix 2 flip-flop of the latch to its off state. As a result, output $\overline{Q2}$ goes high causing FET6 to be turned on thereby applying voltage Vo to the gates of field effect transistors FET1 and FET2 to turn them off or render them non-conducting, deenergizing the load.

A trip operation will now be described. For this operation, it will be assumed that the field effect transistors in the power circuit are turned on so that a signal proportional to the load current is being applied from absolute value circuit AVC through conductor 20 to both instantaneous trip circuit ITC and timed trip circuit TTC. It will be apparent that the outputs of both the timed trip circuit TTC and the instantaneous trip circuit ITC are connected to output conductor 30 so that the turn-off function will be the same regardless of which trip circuit responds to the overload condition. Overload signal input conductor 20 is connected through resistors R46 and R47 in parallel to the inverting inputs of comparators 94 and 96 in the two trip circuits. However, it will be noted that the noninverting inputs of comparators 94 and 96 are connected through resistors R48 and R49 to different voltage points in the voltage divider circuit which includes resistors R31–R33 across supply voltages V+ and Vo, the noninverting input of comparator 94 in the instantaneous trip circuit being connected to the higher voltage point in this voltage divider circuit. The outputs of comparators 94 and 96 are connected to output conductor 30. The outputs of comparator 94 and 96 are also connected through a pull-up resistor R11 to voltage V+ and the output of comparator 94 is connected through feedback resistor R50 to its noninverting input. The inverting input of comparator 96 is connected through a timing capacitor C9 to voltage Vo. The output of comparator 96 is connected through a feedback resistor R51 to its noninverting input which is also connected through a capacitor C10 to voltage Vo. From the foregoing, it will be apparent that when a very high overload occurs such as a rupture current, the output of comparator 94 will go low and this low will be applied through conductor 30 to inverter 98 and to the lower input of NAND logic 50 in logic circuit LG2. Since the upper input of NAND logic 50 is receiving a high from conductor 16, this low on conductor 30 will cause a high to be applied from NAND logic 50 to reset terminal R2 to directly reset the suffix 2 flip-flop in the latch to its off state. The resultant high from the output of inverter 98 is applied to set terminal S1 to directly set the suffix 1 flip-flop to its on state. As a result, output $\overline{Q2}$ the suffix 2 flip-flop goes high and this high is applied to the gate of FET6 in buffer BF, turning it on and thereby causing FET1 and FET2 to be turned off by the voltage Vo through resistor R40. This voltage Vo is also applied through conductor 36 and resistor R52 to turn on LED100 in optoisolator 102 of the trip indicator circuit. Phototransistor 104 which has a resistor R54 connected between its base and emitter is turned on to apply a low to status signal terminal SS to indicate the trip condition. At this point, it may be observed that LED100 is connected through resistor R52 directly to the gates of FET1 and FET2 so that this trip indicator will not only indicate the trip condition of the power circuit but will always indicate the off or on condition of FET1 and FET2, the off condition being indicated with a low at status signal terminal SS and the on condition being indicated with a high at this status signal SS output terminal.

The aforementioned setting of the suffix 1 flip-flop in latch LCH to its on state causes its output terminal Q1 to go high and its output terminal $\overline{Q1}$ to go low. This high at output terminal Q1 is applied to the upper input of NOR logic 64 causing a low to be applied thereby to data terminal D2 to prevent turn-on by periodic clocking of the suffix 2 flip-flop which was turned off as a result of the trip operation. The low at the output terminal $\overline{Q1}$ is applied to the lower input of NOR logic 66. Since control switch CSW is still closed, threshold detector TD is applying a low also to the upper input of NOR logic 66 causing a high to be applied from its output to data terminal D1 of the suffix 1 flip-flop. Although the suffix 1 flip-flop was set to its on state at set terminal S1, it will additionally continue to be clocked on by positive transition pulses from the output of zero voltage detector ZVD directly to clock terminal C1 to insure that it remains on during the trip interval. Also, since the power circuit has been open, there will be a high on conductor 26 from minimum current circuit MCC which will be inverted to a low by inverter 82 at the lower input of NOR logic 84. As a result, negative pulses coming from zero voltage detector ZVD to the upper input of NOR logic 84 will cause positive pulses from the output thereof to the lower input of NOR logic 88 with resultant negative pulses being applied to clock terminal C2. The positive transitions at the trailing edges of these negative pulses will continue to clock the suffix 2 flip-flop to its off state since data terminal D2 has a low for the duration of the trip interval to insure that FET1 and FET2 remain off.

The trip operation of timed trip circuit TTC will now be described. If a small overload occurs on overload input conductor 20, current will flow through resistor R47 to charge capacitor C9. This RC timing circuit consisting of resistor R47 and capacitor C9 will provide a time interval after which timed trip circuit TTC will respond to apply a low to conductor 30. In response to this low on conductor 30, the trip operation occurs in the same manner as was just described in connection with instantaneous trip circuit ITC.

After the overload condition has been cleared, the trip state can be reset by opening control switch CSW and thereby removing the on command. Since the suffix 2 flip-flop in latch LCH has already been reset during the trip operation, it is only necessary to reset the suffix 1 flip-flop. Opening command switch CSW causes the output of threshold detector TD to go high which is applied to the upper input of NOR logic 66 causing a low to be applied from its output to data terminal D1. With a low on data terminal D1, the next zero voltage crossing signal coming from zero voltage detector ZVD will be applied directly to clock terminal C1 to clock the suffix 1 flip-flop to its off state. As a result, output terminal $\overline{Q1}$ will go low and output terminal Q1 will go high. The overload condition having been terminated, conductor 30 at the output of the trip circuits will go high whereby inverter 98 will switch set terminal S1 low. This completes resetting of the circuit following the overload trip condition.

While the apparatus hereinbefore described is effectively adapted to fulfill the objects stated, it is to be understood that the invention is not intended to be confined to the particular preferred embodiment of solid state power controller with overload protection disclosed, inasmuch as it is susceptible of various modifications without departing from the scope of the appended claims.

We claim:
1. A solid state power controller with overload protection for use in a power circuit having an A.C. power supply source and power line connected to a load, said controller having a pair of series-reverse connected controlled power switching devices and a current sensor connected in series in said power circuit, said controlled power switching devices being of a type having two main power terminals and a control terminal for controlling said power switching device by a voltage thereon referenced to a first one of said power terminals and having a high forward blocking voltage and a low reverse blocking voltage, and the improvement comprising:

a control circuit selectively operable for controlling said power switching devices to energize or deenergize said load;

a line-derived rectified control power supply for said control circuit connected to said first power terminal and through the associated one of said controlled power switching devices and through its other power terminal directly across said power supply source so that the rectified control power supply current does not flow through said current sensor or said load thereby to prevent such control power supply current from interfering with the load current sensed by said current sensor as well as to prevent said control power supply current entering as leakage current to the load and so that the control power supply voltage will float with the voltage at said first power terminal thereby to maintain the control terminal to first power terminal voltage high enough to maintain said power switching device conducting despite variation in the voltage at said one power terminal; said control circuit comprising: an overload means responsive to said current sensor detecting an overload condition for rendering said power switching devices non-conducting.

2. The power controller with overload protection claimed in claim 1, wherein:

said control circuit also comprises:

a solid state latch operable when set for rendering said power switching devices conducting and operable when reset for opening said power switching device;

and selectively operable means for setting or resetting said latch;

and said overload means comprising means responsive to said current sensor detecting an overload condition for resetting said latch thereby to reopen said power switching devices.

3. A power controller with overload protection for use in a power circuit having an A.C. power supply source and power line connected to a load through a pair of series-reverse connected controlled power switching devices and a current sensor in series therewith, said controlled power switching devices being of a type having two main power terminals and a control terminal for controlling said power switching device by a voltage thereon referenced to a first one of said power terminals and having a high forward blocking voltage and a lower reverse blocking voltage, and the improvement comprising:

a control circuit selectively operable for controlling said power switching devices to energize or deenergize said load or for tripping said power switching devices in response to said current sensor sensing an overload condition;

a line derived halfwave rectified power supply circuit for said control circuit connected to said first power terminal and through the associated one of said power switching devices and through its other power terminal in said low reverse blocking voltage direction and through said power line directly to said source so that the control power supply current does not flow through said current sensor or said load thereby to prevent such control current from interfering with the load current being sensed as well as to prevent said control current entering as leakage current in the load and so that the control power supply voltage will float with the voltage at said first power terminal thereby to maintain the control terminal to first power terminal voltage high enough to maintain said power switching device conducting despite variation in the voltage at said one power terminal;

said control circuit comprising:

a latch operable when set for applying closing signals to said power switching devices to energize said load and operable when reset for applying off signals to said power switching devices to deenergize said load;

latch control means for selectively setting said latch to apply a turn-on signal to render said power switching devices conducting and for selectively resetting said latch to apply a turn-off signal to render said power switching devices non-conducting;

and overload means responsive to said current sensor sensing an overload condition for resetting said latch to apply a turn-off signal to render said power switching devices non-conducting.

4. The power controller with overload protection claimed in claim 3, wherein:

said latch control means comprises:

selectively operable close-open command means for applying data signals to said latch;

a zero crossing detector for providing a clock signal when the electrical wave of the A.C. power supply line crosses its zero point;

a current responsive circuit for providing a gating signal in response to the current condition sensed by said current sensor;

and logic means responsive to said gating signal for passing said clocking signal to clock said latch into one of its operative states according to the data signal applied to said latch.

5. The power controller with overload protection claimed in claim 4, wherein:

said zero crossing detector is a zero voltage detector that provides said clock signal when the voltage of said supply approaches its zero point;

said gating signal is indicative of a below minimum current condition in said current sensor;

and said logic means responds to said gating signal to clock said latch into its set state.

6. The power controller with overload protection claimed in claim 5, wherein:

said latch comprises a first flip-flop for controlling said power switching devices and a second flip-flop for controlling said first flip-flop on a trip condition;

said second flip-flop having a clock input from said zero voltage detector to enable clocking of said second flip-flop to its "off" state after said overload trip operation and after said close command has been changed to an open command;

said overload means being responsive to said current sensor sensing said overload condition for resetting said first flip-flop to its "off" state to render said power switching devices non-conducting and for concurrently setting said second flip-flop to maintain said first flip-flop in its "off" state despite repeated clocking thereof by said zero voltage detector.

7. The power controller with overload protection claimed in claim 4, wherein:
said zero crossing detector is a zero current detector that provides said clock signal when the current wave of said A.C. line crosses its zero point;
said gating signal is indicative of an above minimum current condition in said current sensor;
and said logic means responds to said gating signal to clock said latch into its reset state.

8. The power controller with overload protection claimed n claim 4, wherein:
said current responsive circuit comprises means for providing differential logic signals according to whether said current is below or above a predetermined minimum value;
a status signal output;
and isolator means responsive to said differential logic signals for providing corresponding indicator operating signals at said status signal output.

9. The power controller with overload protection claimed in claim 8, wherein:
said selectively operable close-open command means comprises:
signal input means for applying differential signals indicative of close and open commands;
a logic circuit;
and a threshold detector responsive to predetermined levels of said differential signals for operating said logic circuit to apply said data signals to said latch.

10. The power controller with overload protection claimed in claim 9, wherein:
said threshold detector comprises:
means providing a threshold voltage level at which it will operate in response to a close command signal;
and hysteresis means responsive to operation of said threshold detector in response to said close command signal for shifting said threshold voltage level at which it will operate in response to an open command signal.

11. The power controller with overload protection claimed in claim 3, wherein:
said line-derived halfwave rectified power supply circuit comprises means for providing a logic level voltage of one polarity that floats with the voltage at said first power terminal and a reference voltage substantially half the value of said logic level voltage.

12. The power controller with overload protection claimed in claim 11, wherein:
said overload means comprises:
an absolute value circuit connected to said current sensor for receiving an A.C. signal proportional to the current in said load and comprising:
means for amplifying said A.C. signal with respect to said reference voltage;
means for rectifying said A.C. signal to provide a signal of one polarity;
means for shifting said one polarity signal to the level of said floating control power supply voltage to provide an overload signal;
and an overload trip means responsive to said overload signal for resetting said latch whereby to control opening of said power switching devices.

13. The power controller with overload protection claimed in claim 12, wherein:
said overload trip means comprises instantaneous trip means responsive to a high overload signal for immediately resetting said latch.

14. The power controller with overload protection claimed in claim 12, wherein:
said overload trip means comprises timed trip means responsive to a low overload signal for resetting said latch after a time interval having an inverse relation to the value of said low overload signal.

15. The power controller with overload protection claimed in claim 3, wherein:
said control circuit also comprises:
a status signal output; an isolator means directly responsive to said turn-on and turn-off signals applied to said power switching devices for applying differential signals to said status signal output.

16. The power controller with overload protection claimed in claim 3, wherein:
said latch comprises a first flip-flop for controlling said power switching devices and a second flip-flop for
said overload means being responsive to said current sensor sensing said overload condit in for resetting said first flip-flop to its "off" state to apply said turn-off signal to render said power switching devices non-conducting and for concurrently setting said second flip-flop to maintain said first flip-flop in its "off" state.

* * * * *